US009772922B2

(12) United States Patent
Huang et al.

(10) Patent No.: US 9,772,922 B2
(45) Date of Patent: Sep. 26, 2017

(54) PROTECTION METHOD FOR DATA INFORMATION ABOUT ELECTRONIC DEVICE AND PROTECTION CIRCUIT THEREFOR

(71) Applicant: Shenzhen Xinguodu Technology Co., Ltd., Shenzhen, Guangdong (CN)

(72) Inventors: Shanbing Huang, Shenzhen (CN); Jianguang Zhai, Shenzhen (CN); Hongyuan Wu, Shenzhen (CN)

(73) Assignee: Shenzhen Xinguodu Technology Co., Ltd., Shenzhen (CN)

( * ) Notice: Subject to any disclaimer, the term of this patent is extended or adjusted under 35 U.S.C. 154(b) by 87 days.

(21) Appl. No.: 14/647,097

(22) PCT Filed: Sep. 11, 2013

(86) PCT No.: PCT/CN2013/083258
§ 371 (c)(1),
(2) Date: May 25, 2015

(87) PCT Pub. No.: WO2014/082477
PCT Pub. Date: Jun. 5, 2014

(65) Prior Publication Data
US 2015/0301919 A1    Oct. 22, 2015

(30) Foreign Application Priority Data

Nov. 29, 2012 (CN) .......................... 2012 1 0498948
Jun. 26, 2013 (CN) .......................... 2013 1 0260806

(51) Int. Cl.
*G06F 21/00* (2013.01)
*G06F 11/30* (2006.01)
(Continued)

(52) U.S. Cl.
CPC .... *G06F 11/3062* (2013.01); *G01R 31/31719* (2013.01); *G05F 5/00* (2013.01);
(Continued)

(58) Field of Classification Search
CPC .......... G06F 21/86; G06F 21/75; G06F 21/87; G06F 21/558; G06F 11/3062; H04L 9/003; H04L 9/004
(Continued)

(56) References Cited

U.S. PATENT DOCUMENTS

2010/0213951 A1* 8/2010 Lewis ................... H01L 23/576
324/649
2011/0095919 A1* 4/2011 Ostermoller ............ G06F 3/044
341/33
(Continued)

FOREIGN PATENT DOCUMENTS

CN        1460203 A    12/2003
CN     101419522 A    4/2009
(Continued)

OTHER PUBLICATIONS

International Search Report of PCT Patent Application No. PCT/CN2013/083258 dated Dec. 19, 2013.

*Primary Examiner* — Alexander Lagor

(57) ABSTRACT

Disclosed is a method for protecting data information of an electronic device, comprising the following steps: 1) performing power-on detection on an electronic device of which production and installation are completed, detecting the stray capacitance of a signal line thereof, and recording same as a standard value of the signal line; 2) during a power-on operation, monitoring the stray capacitance of the signal line; 3) comparing the monitored capacitance value with the standard value, and entering step 4) when exceeding the set threshold value, otherwise entering step 2); and 4) erasing significant data in the electronic device. The method uses the manner of monitoring the stray capacitance to
(Continued)

monitor the contact of outside foreign matter with the signal line, guarantees the security of data in the electronic device, and has the characteristics that the implementation process is simple and easy, safe and reliable, and the cost is low.

3 Claims, 5 Drawing Sheets

(51) Int. Cl.

| | | |
|---|---|---|
| *G01R 31/317* | (2006.01) | |
| *G06F 21/75* | (2013.01) | |
| *G07G 3/00* | (2006.01) | |
| *G06F 21/82* | (2013.01) | |
| *G05F 5/00* | (2006.01) | |
| *G06F 1/32* | (2006.01) | |

(52) U.S. Cl.
CPC ............ *G06F 1/3206* (2013.01); *G06F 21/75* (2013.01); *G06F 21/82* (2013.01); *G07G 3/00* (2013.01)

(58) Field of Classification Search
USPC .............................................. 726/34; 713/194
See application file for complete search history.

(56) References Cited

U.S. PATENT DOCUMENTS

2012/0056635 A1* 3/2012 Oomura .................. G06F 21/86
324/713
2013/0157702 A1* 6/2013 Di Luoffo ............. H04W 12/04
455/500

FOREIGN PATENT DOCUMENTS

| | | | |
|---|---|---|---|
| CN | 102509052 A | | 6/2012 |
| JP | 2012243232 A | * | 12/2012 |

\* cited by examiner

PROTECTION METHOD FOR DATA INFORMATION ABOUT ELECTRONIC DEVICE AND PROTECTION CIRCUIT THEREFOR

FIELD OF THE INVENTION

The present invention relates to protection method for data information and protection circuit thereof, and more particularly to a method for protecting data information about electronic device and protection circuit thereof.

BACKGROUND OF THE INVENTION

POS machines are point-of-sale terminals with a function of non-cash settlement, which are used to complete transactions online by means of reading magnetic stripe information from a debit card via a card reader and entering personally identifiable information (password) by the cardholder, and they are applied to supermarkets, chain stores, hypermarkets, restaurants and so on. Since it concerns transactions online of debit card, it requires high safety performance and it must guarantee important data in the POS machine from being stolen.

To meet the data security standard, the present POS machine uses a method of surrounding the important data lines or sensitive elements via safe signal lines to prevent the illegal persons from detecting the important data lines and elements. If the CPU detects that the levels of the safe signal lines are changed, the CPU will erase all of the protected data.

The methods for protecting important data lines or sensitive elements via safe signal lines include wire-winding technology, contact protection technology and zebra technology. The wire-winding technology is generally achieved by disposing the safe signal lines on PCB according to a certain principle and manner and combining some PCB with wire wrapping, support and protecting frame and so on, so as to make the CPU and IC card chip be surrounded by the safe signal lines. If the electronic equipment is disassembled in anyway, the processor will erase all of the protected data. However, the wire-winding technology is complex and costly, and due to the need of wire wrapping surrounding the CPU and IC card chip, its development period is too long.

Contact protection technology is achieved by utilizing switching principle. The closing of the switch can be achieved by disposing the conducting resin on the contact and applying some pressure thereon. The zebra is similar to a switch, the conductive interlayer of which presents a certain conductivity after suffering pressure in a certain direction. The contact and zebra are used for preventing disassembly. If somebody attempts to detach the main case, mainboard and cover plate of the POS machine, the CPU will erase the protected data. However, this technology is costly.

Except the POS machine, there are ATM machine and all kinds of intelligent terminals provided to the public and working in unattended, the important date of which may be stolen.

Therefore, it is necessary to develop a method for protecting data information and protection circuit thereof with low costs and ease of maintenance.

SUMMARY OF THE INVENTION

One object of the present invention is to provide a method for protecting data information about an electronic equipment to overcome the disadvantages of the prior art.

Another object of the present invention is to provide a circuit for protecting data information about an electronic equipment.

To achieve above objects, there are provided following technical solutions:

A method for protecting data information of an electronic equipment, comprising the following steps: (1) performing a power-on detection on an electronic equipment of which production and installation are completed, detecting stray capacitance of a signal line thereof, and recording same as a standard value of the signal line; (2) during a power-on operation, monitoring the stray capacitance of the signal line; (3) comparing a monitored capacitance value with the standard value, and entering step (4) when exceeding a preset threshold value, otherwise entering step (2); and (4) erasing significant data in the electronic equipment.

According to a further technical solution, the number of the signal lines is more than one, during the power-on detection, recording the standard value of the stray capacitance of each signal line, and during the power-on operation, monitoring the stray capacitance of each signal line sequentially or randomly and comparing the monitored capacitance value with corresponding standard value.

According to a further technical solution, the stray capacitance of the signal line is monitored by a direct monitoring method which comprises steps of: charging and discharging the stray capacitance of the signal line, monitoring voltage and charge-discharge time of the stray capacitance and then working out capacitance value of the stray capacitance according to a formula about charge-discharge of the capacitance.

According to a further technical solution, the stray capacitance of the signal line is monitored by an indirect monitoring method which comprises steps of: monitoring oscillation frequency of a RC oscillating circuit or a LC oscillating circuit connected with the stray capacitance and working out capacitance value of the stray capacitance according to a formula about oscillation frequency.

According to a further technical solution, a selecting circuit is provided between the signal lines and the RC oscillating circuit or the LC oscillating circuit for building communications between the signal lines and the RC oscillating circuit or the LC oscillating circuit one by one.

A circuit for protecting data information of an electronic equipment, comprising a processor and an electronic device connected with the processor via a signal line, wherein further comprises a capacitance detection module electrically connected with the signal line, the capacitance detection module having a detecting end connected with the signal line and a pulse output end connected with the processor; when performing power-on detection on the electronic equipment for the first time, a pulse signal formed by the stray capacitance of the signal line together with the capacitance detection module is transmitted to the processor, and then the frequency of the pulse signal is recorded as a standard frequency by the processor; during the use of the electronic equipment, the processor compares a received real-time frequency with the standard frequency and makes a judgment that there is outside foreign matter contacting with the signal line if there is a difference between the real-time frequency and the standard frequency exceeding a preset value, the stray capacitance of the signal line is changed and the pulse signal formed by the capacitance detection module combining the stray capacitance is also changed and the processor erases significant data in the electronic equipment; the signal line is a connecting wire connecting the electronic device and the processor.

According to a further technical solution, the capacitance detection module is a RC oscillating circuit comprising an inverter; the number of the signal lines is more than one; and a multiplexer is provided between the signal lines and the capacitance detection module.

According to a further technical solution, the multiplexer is an analog 8-channel multiplexer which has eight input ends connected with the signal lines, one output end connected with the capacitance detection module and three control input ends connected with the processor, and the analog 8-channel multiplexer determines which one of the input ends to communicate with the output end according to a composite signal from the three control input ends; when performing power-on for the first time, the processor sends eight composite signals to the analog 8-channel multiplexer one by one, and records a pulse frequency produced by the capacitance detection module together with the signal line relative to each composite signal as a standard frequency relative to the composite signal; during the use, the processor sends out the composite signals one by one or at random and compares the received real-time frequency with the standard frequency relative to the composite signal, and the processor will make a judgment that there is outside foreign matter contacting with the signal line relative to the composite signal if there is a difference between the real-time frequency and the standard frequency relative to the composite signal exceeding a preset value, the stray capacitance of the signal line is changed and the pulse signal formed by the capacitance detection module combining the stray capacitance is also changed and the processor sends out an alarm signal and/or a signal for protecting the significant data; the electronic equipment is a POS machine, an ATM machine or a cash register; and the electronic device comprise a keypad, a display screen, an IC card reader and a magcard reader.

A circuit for protecting data information of an electronic equipment, comprising a processor and an electronic device connected with the processor via a signal line, wherein further comprises a capacitance detection module electrically connected with the signal line, the capacitance detection module having a detecting end connected with the signal line, a control end and a signal output end both of which are connected with the processor; the capacitance detection module is a capacitance detection chip; when performing power-on detection on the electronic equipment for the first time, the capacitance detection module detects the stray capacitance of the signal line and sends a detected capacitance value to the processor, and the processor records the capacitance value as a standard capacitance value; and during the use, the processor receives the capacitance value detected by the capacitance detection module in real time and compares same with the standard capacitance value, and the processor will make a judgment that there is outside foreign matter contacting with the signal line and then erase significant data in the electronic equipment if there is a difference between the real-time capacitance value and the standard capacitance value exceeding a preset threshold value.

A circuit for protecting data information of an electronic equipment, wherein the electronic equipment is a POS machine and the circuit for protecting data information comprises:

A multi-channel selecting module, the multi-channel selecting module being a 74HC4051 type multi-channel chip which has eight external signal input ends (A0 to A7), three digital selecting ends (S0 to S2) and one signal output end (A); and A capacitance detection module, comprising a first inverter (U418A), a second inverter (U418B) and a third inverter (U418C), an input end (1) of the first inverter (U418A) being connected with the output end (A) of the multi-channel selecting module (90) via a first capacitor (C35), an output end (2) of the first inverter (U418A) being connected with an input end (3) of the second inverter (U418B), an output end (4) of the second inverter (U418B) being connected with an input end (5) of the third inverter (U418C), a first resistor (R1) being connected between the input end (1) and the output end (2) of the first inverter (U418A), the input end (1) of the first inverter (U418A) being connected with the output end (4) of the second inverter (U418B) via a second resistor (R2) and a second capacitor (C37) both of which are connected in series and a connection point of which is connected with an output end (6) of the third inverter (U418C) via a third resistor (R3), the input end (5) and the output end (6) of the third inverter (U418C) being connected to an output end (Key-LED) via a fourth resistor (R4) and a fifth resistor (R5), respectively; a power input end (VCC33) of the first inverter (U418A) being grounded via a third capacitor (C207) and a forth capacitance (C135) both of which are connected in parallel.

Compared with the prior art, the present invention has following beneficial effects:

the protection method of the present invention is achieved by detecting the change of the stray capacitance value of the signal lines by means of monitoring the signal lines in real time, judging that there is outside foreign matter detecting the signal lines if the change value is exceeding a preset threshold value and then erasing the important data in the electronic equipment. The method uses the manner of monitoring the stray capacitance to monitor the contact of outside foreign matter with the signal lines, thereby ensuring the security of data in the electronic device. The method has the characteristics that the implementation process is simple and easy, safe and reliable, and the cost is low. It could be applied for data protection of various kinds of electronic equipments in information field, such as an electronic equipment used for electronic trading, a storage equipment for storing significant data and so on.

The protection circuit of the present invention is achieved by an indirect monitoring method, and by connecting oscillating circuit composed of inverters, resistors and capacitors with wire to be detected, the change of the stray capacitance of the wire will cause the change of the oscillation frequency. When the outside foreign matter contacting with the wire to be detected, the processor will detect the change of the oscillation frequency and then will make a judgment that there is contact of outside foreign matter with the signal line, and finally will output alarm signal and related processing signal. The protection circuit is not only safe and reliable, but also has short development cycle, low manufacturing cost and simple structure; and it is easy to produce and could be applied to different electronic equipments, such as POS machine, ATM machine and so on. The important data information of the electronic equipment may be detected from the outside by selecting some of the wires, thus a multiplexer is used so that more than one wire to be detected could share one capacitance detection module thereby saving costs and optimizing the circuit structure. Additionally, by means of using composite control signal of the processor to select certain one of the analog channels to be breakover, when an illegal person removes the capacitance detection module, only one of the frequency signals of the wires to be detected before the module is removed could be recorded. If the frequency signal is replaced with other signal, it is hard to make a match with the composite control signal of the processor, and the other frequency signals even cannot be replaced with other signals, thereby increasing the difficulty of the data theft of the electronic equipment and greatly enhancing the safety performance of the electronic equipment.

The protection circuit of the present invention also could be achieved by using capacitance detection chip with multiple detecting ports to monitoring the stray capacitance of each signal line directly thereby determining whether each of the signal lines contacts with the conductive foreign matter. The circuit structure uses an integrated chip to monitor the change of the stray capacitance of each signal line in real time and in sequence or at random. It has the characteristics that the circuit structure is simple, the cost is low, it is easy to produce and maintain and it is not easy to break.

The present invention could be applied to POS machine, be applied to equipment used for electronic trading, such as ATM machine, and be applied to storage equipment for storing significant data, such as database of safety management department and so on.

The present invention will be further described as follows by combining the accompanying drawings and embodiments.

DESCRIPTION OF THE REFERENCE NUMBERS IN THE ACCOMPANYING DRAWINGS

Figure 1:
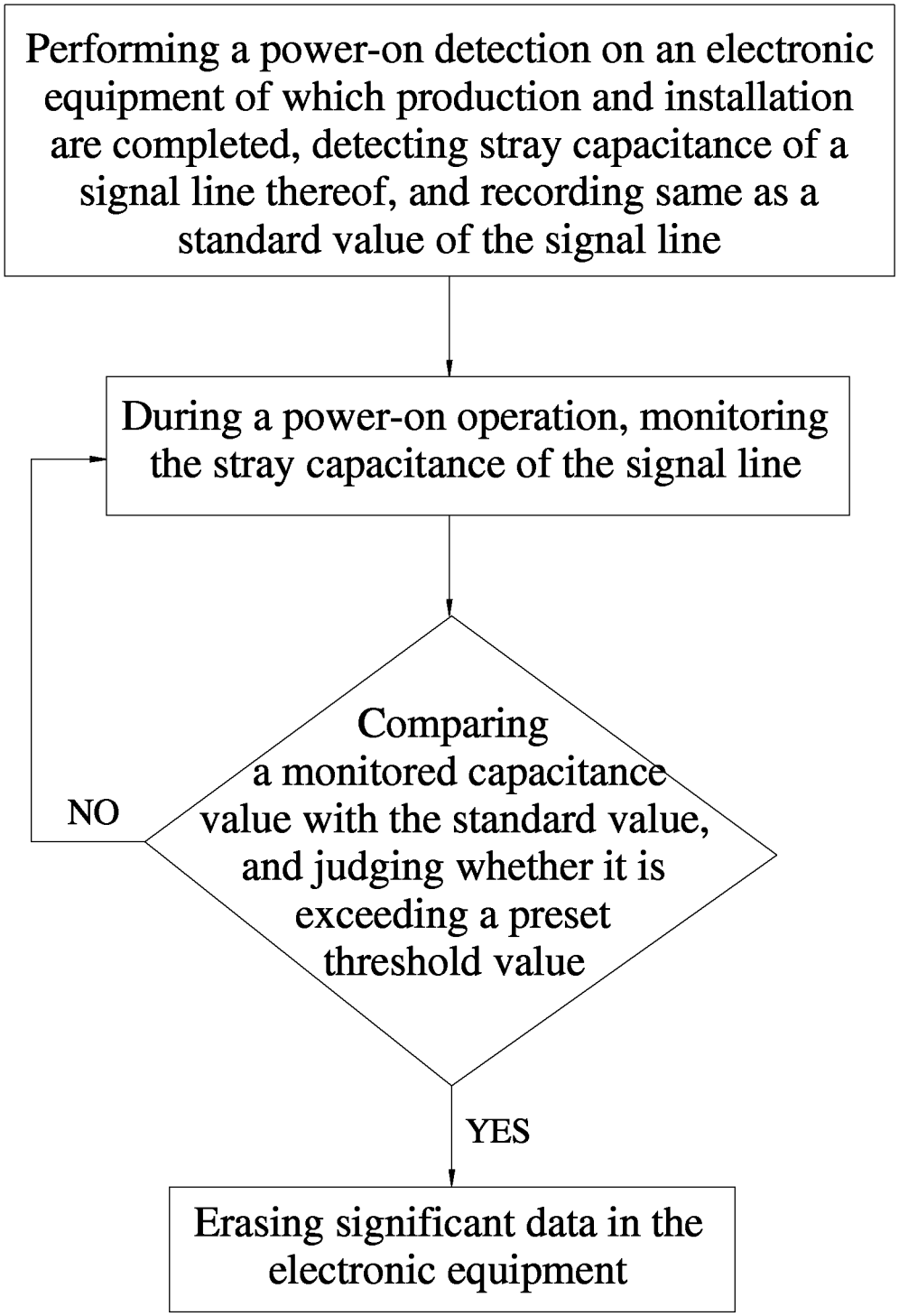
FIG. 1 is a flow chart of a method for protecting data information about an electronic equipment according to an embodiment of the present invention.

POS machine 10; processor 20; electronic device 30; detected wire 40; capacitance detection module 50; detected end 51; pulse output end 52, multiplexer 60; input end 61; output end 62; and control input end 63.

DETAILED DESCRIPTION OF ILLUSTRATED EMBODIMENTS

For understanding the technical content of the present invention more sufficiently, some embodiments of the present invention will now be described as follows, by way of example only, with reference to the accompanying drawings.

As shown in FIG. 1, according to the present invention, the method for protecting data information about an electronic equipment includes following steps:

(1) Performing power-on detection on an electronic equipment of which production and installation are completed, detecting stray capacitance of a signal line thereof, and recording same as a standard value of the signal line; such a step is generally implemented during factory settings of the production.

(2) During a power-on operation, monitoring the stray capacitance of the signal line; such a step is implemented during start-up of the electronic equipment, the monitoring period could be 0.01 s to 1 s, which is not too short or too long; the monitoring period could not be too short, so as to avoid a waste of resources, and the monitoring period could not be too long, so as to protect the data from being stolen quickly.

(3) Comparing a monitored capacitance value with the standard value, and entering step (4) when exceeding a preset threshold value, otherwise entering step (2); the preset threshold value is relative to the precision of a detection device, and it could be 0.1 pF to 1 pF.

(4) Erasing significant data in the electronic equipment; the erasing step could be implemented in a way of emptying the data or be implemented by formatting or destroying the data in a specific way (corresponding to modifying the content of the data) so that a data thief cannot obtain real content of the data.

Generally, there is more than one signal line (due to one electronic equipment being composed of more than one electronic device). When performing power-on detection, record the standard value of the stray capacitance of each signal line, and during the power-on operation, monitor the stray capacitance of each signal line sequentially or randomly and compare the monitored capacitance value with corresponding standard value.

There are two ways for monitoring the stray capacitance of the signal line as follows:

One is a direct monitoring method, which includes steps of: charging and discharging the stray capacitance of the signal line, monitoring voltage and charge-discharge time of the stray capacitance and then working out the capacitance value of the stray capacitance according to a formula about charge-discharge of the capacitance. The method could be implemented by a capacitance detection chip, such as a GT811 type capacitance detection chip shown in FIG. 6 according to an embodiment of the present invention.

The other one is an indirect monitoring method, which includes steps of: monitoring oscillation frequency of a RC oscillating circuit or a LC oscillating circuit connected with the stray capacitance and working out capacitance value of the stray capacitance according to a formula about oscillation frequency. There is a selecting circuit provided between the signal line and the RC oscillating circuit or the LC oscillating circuit for building communication between the signal lines and the RC oscillating circuit or the LC oscillating circuit one by one. According to an embodiment shown in FIG. 3 to FIG. 5, the method is implemented by a RC oscillating circuit and an 8-channel multiplexer.

Figure 2:
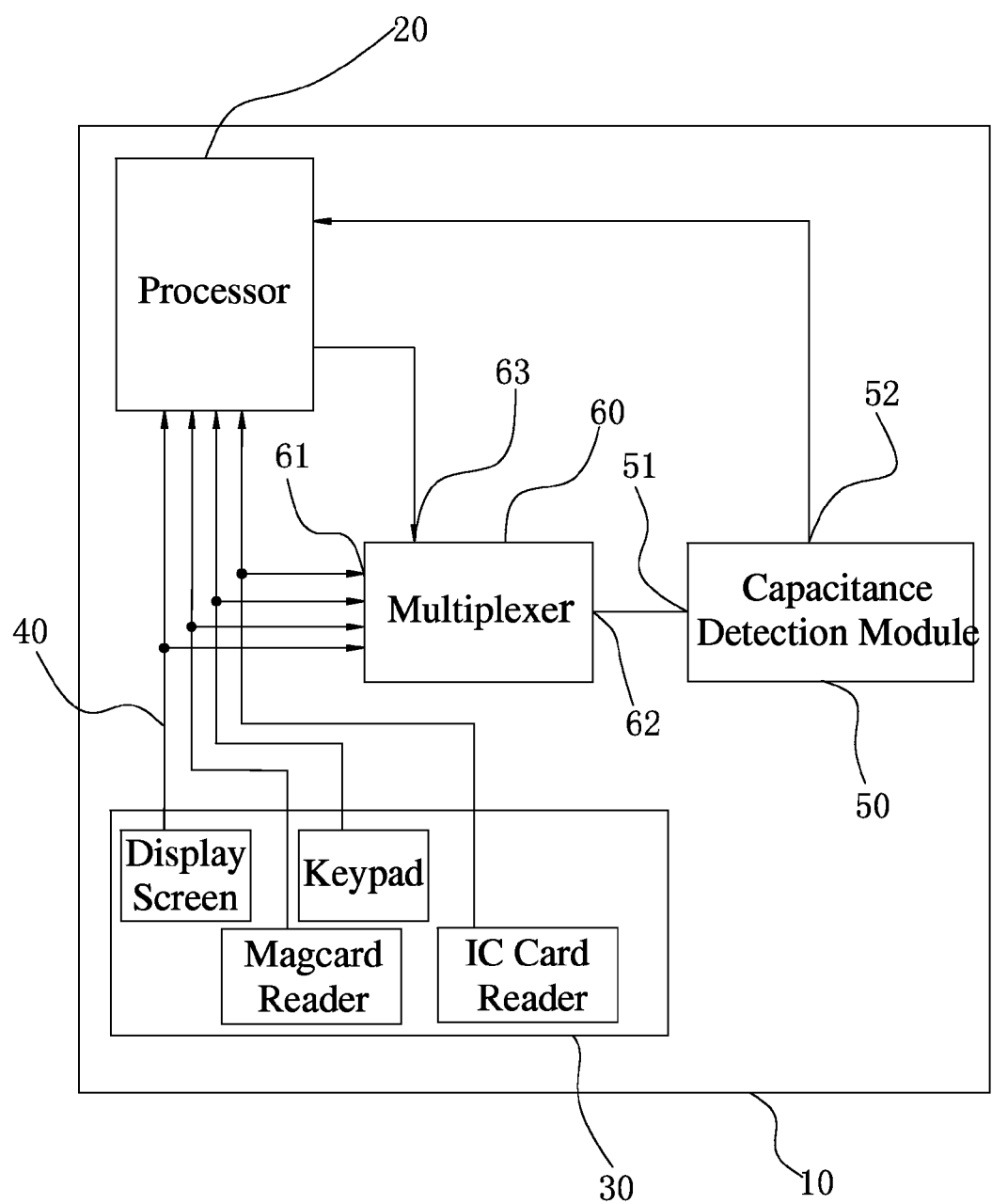
FIG. 2 is a block diagram of a circuit for protecting data information about an electronic equipment according to a first embodiment of the present invention (using an indirect monitoring method)

According to an embodiment shown in FIG. 2, there provided is a circuit for protecting data information about an electronic equipment. The electronic equipment is POS machine 10 and it includes a processor 20, a plurality of electronic devices 30 all connected with the processor 20 and a capacitance detection module 50 electrically connected with the wires 40 to be detected. The capacitance detection module 50 is a RC oscillating circuit including inverters (due to changing the charge-discharge time of the oscillating circuit by means of the change of the stray capacitance of the signal line, thereby changing the output frequency of the oscillating circuit, it is called capacitance detection module). The capacitance detection module has a detecting end 51 connected with the wires 40 and a pulse output end 52 connected with the processor 20. When performing power-on detection on POS machine 10 for the first time, a constant pulse signal is formed by the stray capacitance of the wire 40 to be detected together with the capacitance detection module 50 and it is transmitted to the processor 20. And then the frequency of the pulse signal is recorded as a standard frequency by the processor 20. During the use of the electronic equipment, the processor 20 compares a received real-time frequency with the standard frequency, and makes a judgment that there is outside foreign matter contacting with the wire 40 to be detected if there is a difference (the value could be positive and also could be negative) between the real-time frequency and the standard frequency exceeding a preset value (the preset value depending on the value of frequency variation under normal conditions, it could be 1% of the standard frequency and also could be 0.1% of the standard frequency). The stray capacitance of the wire 40 to be detected is changed and the pulse signal formed by the capacitance detection module 50 combining the stray capacitance is also changed and the processor 20 sends out an alarm signal and/or a signal for protecting the significant data. Wherein, the wire 40 to be detected is a connecting wire connecting the electronic device 30 and the processor 20. According to this embodiment, a preferred solution is provided as follows: there is an analog 8-channel multiplexer 60 provided between the wires 40 to be detected and the capacitance detection module 50. The multiplexer 60 has eight input ends 61 connected with wires 40 to be detected, one output end 62 connected with the capacitance detection module 50 and three control input ends 63 all connected with the processor 20. The analog 8-channel multiplexer 60 determines which one of the input ends to communicate with the output end according to a composite signal from the three control input ends 63. When performing power-on for the first time, the processor 20 sends eight composite signals to the analog 8-channel multiplexer 60 one by one, and records a pulse frequency produced by the capacitance detection module together with the wire to be detected relative to each composite signal as a standard frequency relative to the composite signal. During the use, the processor sends out the composite signals one by one or at random and compares the received real-time frequency with the standard frequency relative to the composite signal, and the processor makes a judgment that there is outside foreign matter contacting with the wire to be detected and relative to the composite signal if there is a difference between the real-time frequency and the standard frequency relative to the composite signal exceeding a preset value. The stray capacitance of the signal line is changed and the pulse signal formed by the capacitance detection module combining the stray capacitance is also changed and the processor sends out an alarm signal and/or a signal for protecting the significant data.

The electronic devices include a keypad, a display screen, an IC card reader and a magcard reader. According to other embodiments, the electronic equipment could be an ATM machine or a cash register.

Figure 3:
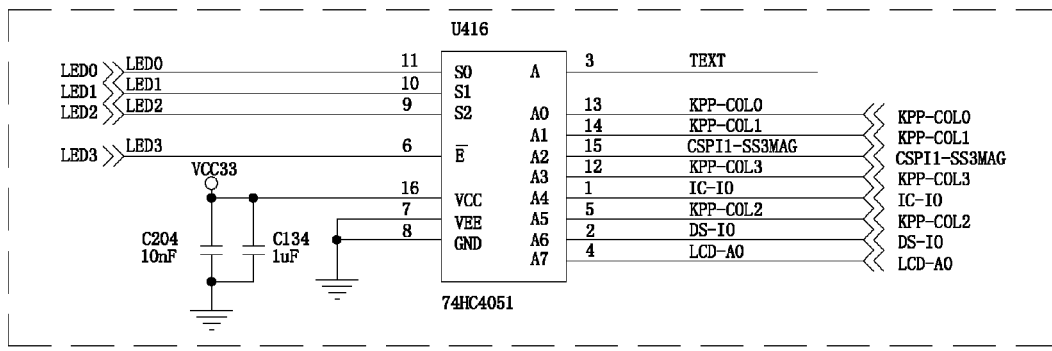
FIG. 3 is a first schematic circuit diagram of the circuit for protecting data information about an electronic equipment according to a second embodiment of the present invention (illustrating a multiplexer)
Figure 4:
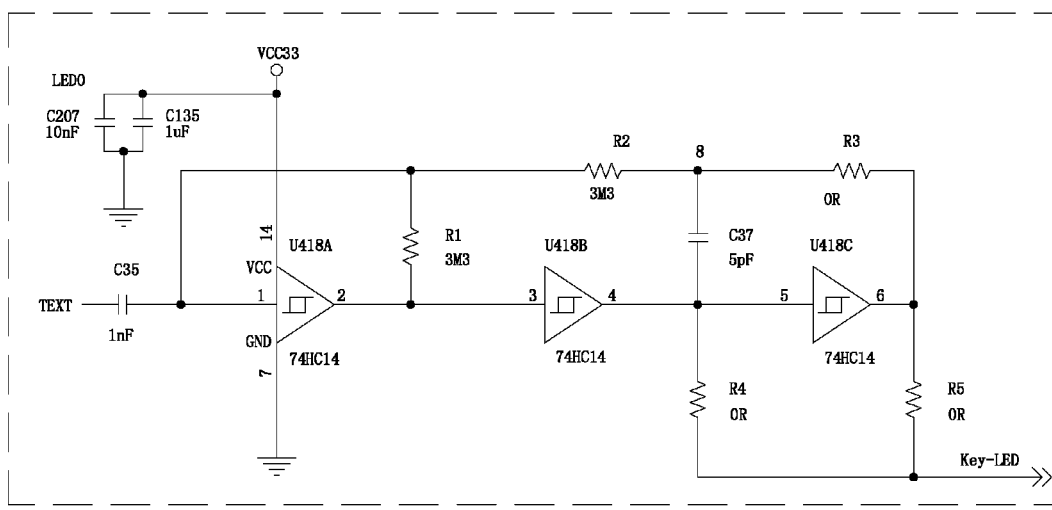
FIG. 4 is a second schematic circuit diagram of the circuit for protecting data information about an electronic equipment according to a second embodiment of the present invention (illustrating a capacitance detection module)
Figure 5:
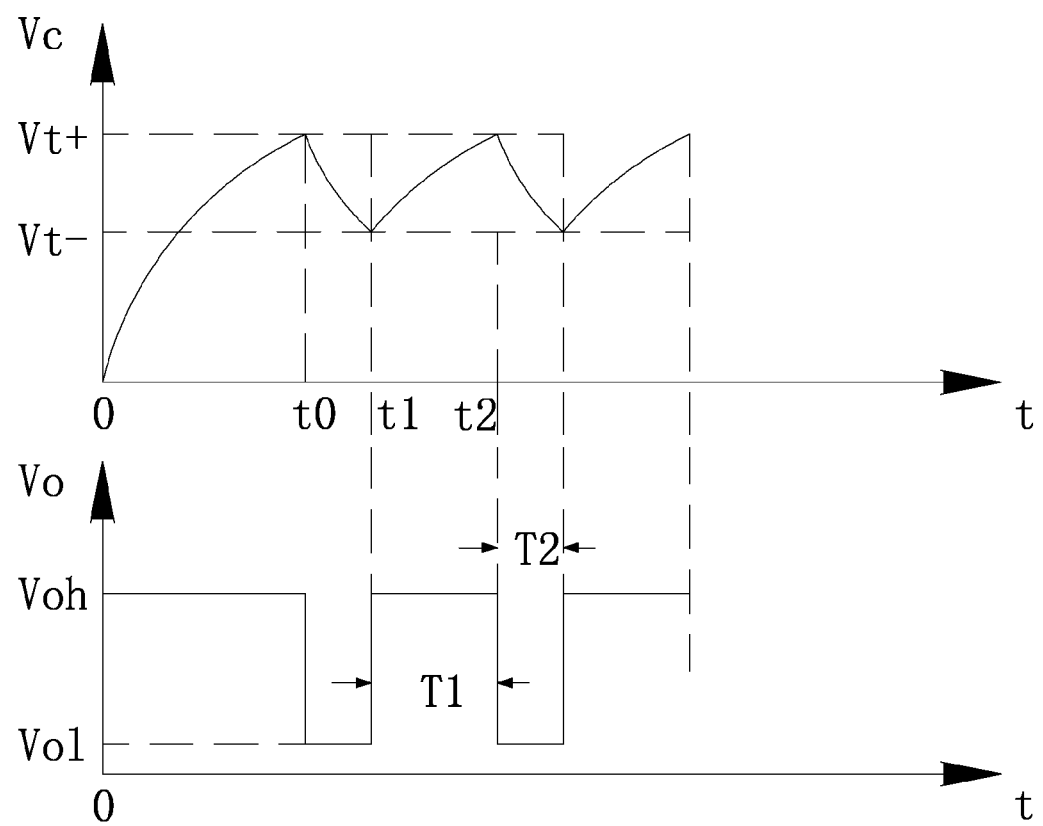
FIG. 5 illustrates a pulse waveform of an input end and an output end of the capacitance detection module of the circuit for protecting data information about an electronic equipment according to a second embodiment of the present invention.

As shown in FIG. 3 to FIG. 5, according to another specific embodiment of the present invention, the electronic equipment is POS machine and the circuit for protecting data information includes a multi-channel selecting module and a capacitance detection module as follows:

The multi-channel selecting module (multiplexer) has digital selecting ends, external signal input ends and signal output end. Specifically, the multi-channel selecting module is a multi-channel chip and the type of the chip is 74HC4051, which has three digital selecting ends (S0 to S2), eight external signal input ends (A0 to A7) and one signal output end (A). Wherein, the pins of A0 to A7 are connected with the significant signal lines, such as scanning lines of keypad and data lines of IC card; the pins of S0 to S2 are connected with the signal lines LED0, LED1 and LED2, respectively. The processor could cause the data of certain one of the pins of A0 to A7 to be transmitted to the signal output end A by controlling the signal lines LED0, LED1 and LED2.

The capacitance detection module includes a first inverter U418A, a second inverter U418B and a third inverter U418C all of which is the type of 74HC14. The first inverter U418A has an input end 1 connected with the output end A of the multi-channel selecting module 90 via a first capacitor C35 and an output end 2 connected with an input end 3 of the second inverter U418B. An output end 4 of the second inverter U418B is connected with an input end 5 of the third inverter U418C and a first resistor R1 is connected between the input end 1 and the output end 2 of the first inverter U418A. The input end 1 of the first inverter U418A is connected with the output end 4 of the second inverter U418B via a second resistor R2 and a second capacitor C37 both of which are connected in series and a connection point of which is connected with an output end 6 of the third inverter U418C via a third resistor R3. The input end 5 and the output end 6 of the third inverter U418C being connected to an output end Key-LED via a fourth resistor R4 and a fifth resistor R5, respectively.

The power input end VCC33 of the first inverter U418A is grounded via a third capacitor C207 and a forth capacitance C135 both of which are connected in parallel, thereby eliminating the circuit interference produced by the AC single.

During operation of the electronic equipment, the processor causes the data of certain one of the pins of A0 to A7 to be transmitted to the signal output end A by controlling the signal lines LED0, LED1 and LED2. When certain one of the ends A0 to A7 is selected, a RC charge-discharge loop is formed by the stray capacitance of anyone of A0 to A7 together with the resistances R1, R2 and R3. When the POS machine is power off, there is no charge on the first capacitor C35 and the stray capacitance. When the POS machine is startup, the capacitance detection module starts to work, the input end 1 of the first inverter U418A is low level and the output end 2 thereof is high level, and due to two reverse processes of the second inverter U418B and the third inverter U418C, the output end 6 of the third inverter U418C is also high level. The first inverter U418A and the third inverter U418C recharge the first capacitor C35 and the stray capacitance of anyone of the pins A0-A7 via the first resistor R1 and the second resistor R2, respectively. The input end 1 of the first inverter U418A has a voltage waveform Vc shown in FIG. 2. At time t0, the voltage of the input end 1 of the first inverter U418A reaches at VT+, which is considered as high level input by the first inverter U418A, thus the output end 2 is low level and the output end 6 of the third inverter U418C is also low level. Both of the output end 2 of the first inverter U418A and the output end 6 of the third inverter U418C have a voltage waveform Vo shown in FIG.

2. At this time, the first capacitor C35 and the stray capacitance of anyone of the pins A0-A7 discharge via the first resistor R1 and the second resistor R2, during the time of t0-t1. When the voltage of the first inverter U418A is reduced to be VT−, which is considered as low level input by the first inverter U418A, the output end 2 is changed to be high level and the output end 6 of the third inverter U418C is also high level. At this time, the first inverter U418A and the third inverter U418C recharge the first capacitor C35 and the stray capacitance of anyone of the pins A0-A7 again via the first resistor R1 and the second resistor R2, respectively, and the waveform thereof is shown as the time of t1-t2 in FIG. 2.

The capacitance detection module has a charged state and a discharged state, between which there is a switch with the action of the multi-channel selecting chip 74HC14. The voltages of the first capacitor C35 and the stray capacitance of anyone of the pins A0-A7 will form a periodic signal and all of the first inverter U418A, the second inverter U418B and the third inverter U418C have a function of wave conversion, thus the output end 4 of the second inverter U418B can output a rectangular wave with a certain frequency. The frequency of the rectangular wave is $1/(T1+T2)$, which is relative to the first capacitor C35, the stray capacitance of anyone of the pins A0-A7, the first resistor R1 and the second resistor R2. When the stray capacitance of anyone of the pins A0-A7 is changed, the frequency will also be changed. Thus, the processor can determine whether the stray capacitance of anyone of the pins A0-A7 is changed by detecting the change of the frequency.

When somebody attempts to probe the important data in the POS machine, there are generally two ways to achieve, by probing the signal lines directly or finding a way to cause the capacitance detection module failure. If using the way of probing directly, the illegal person will use a probe or a needle to probe the signal on the data line. Although the capacitance value on the probe or needle is general small, the capacitance value of the present probe or needle is at least more than 5 pF. According to the embodiment of the present invention, the capacitance detection module can detect the change of the capacitance of 1 pF, which is much less than the capacitance value 5 pF of the probe or needle, by means of the use of high-precision capacitor with little temperature influence and the optimization of the software algorithm. Thus it is very hard to detect the signals of the data lines by probe. When the probe or needle detects the signals of the data lines, the stray capacitance of anyone of pins A0 to A7 will be changed and then the frequency will also be changed, and the processor will erase the protected data immediately, thereby protecting the data from being stolen. Additionally, the important data lines could be arranged on the inlayer of the PCB so as to reduce the possibility of being detected. If using the way of causing the capacitance detection module failure, the illegal person will firstly detect the frequency of the output end Key-LED of the capacitance detection module, remove the capacitance detection module in a power-off state and then input a signal with same frequency as that of the output end Key-LED of the capacitance detection module to the processor after startup of the POS machine. However, by this way, only one same frequency as that of certain one of A0 to A7 can be achieved, while the processor detects the frequency of anyone of A0 to A7 constantly and circulating via digital selecting ends. Compared with the initial calculated 8-channel frequencies, the signals transmitted to the processor need to change frequency thereof so as to keep consistent with the 8-channel frequencies, which is very hard to be achieved.

Thus, the present invention can protect the data from being stolen availably. When the frequencies are inconsistent (not the same), it will judge that there is foreign matter contacting with the wires to be detected, and the processor will send out an alarm signal or execute related protective action, such as starting a self-destruction so as to destroy the important data. According to the circuit of the embodiment, the change of the pulse frequency produced by the stray capacitance less than 1 pF of the wire can be detected, while the contact of a general foreign matter (usually a conductor) with the wires to be detected will cause a change of 5 pF, thus any case of the wires to be detected being probed will be detected. Eight input ends of the analog 8-channel multiplexer could be used all. If there are not so many wires to be detected, the needless input ends could be idle. Eight input ends could be used to detect eight wires to be detected and it is enough for the protection of electronic equipment.

According to other embodiments, it could be achieved by only using two inverters. The third inverter U418C of the above embodiment is provided for enhancing load capacity, it could be replaced with other types and the parameters of the resistors and capacitor could be changed according to actual needs. According to other embodiments, if the wires to be detected are too many, it could be added to be two multiplexers; and if the capacitance detection module is not enough, it also could be added to be two.

Figure 6:
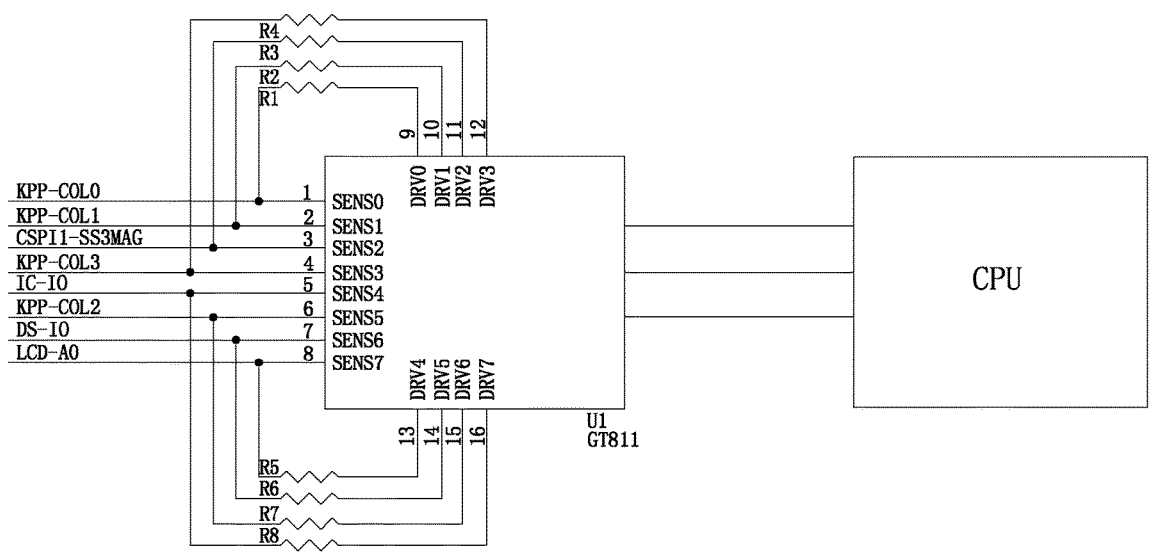
FIG. 6 is a schematic circuit diagram of the circuit for protecting data information about an electronic equipment according to a second embodiment of the present invention (illustrating a chip, and using a direct monitoring method).

According to an embodiment shown in FIG. 6, it is a circuit for protecting data information about an electronic equipment by using a direct monitoring method and using a chip of GT811 type. There are eight detecting input ends SENS1-SENS7 which are connected with eight signal lines. The right side thereof has control end and output end which are connected with the central processing unit (CPU) for receiving control signals and outputting monitored capacitance values. Wherein there are resistances R0-R7 provided for current-limiting when charging and discharging.

The direct monitoring method includes steps of: charging and discharging a capacitance, detecting voltage and charge-discharge time of the capacitance and then working out capacitance value according to a formula about charge-discharge of the capacitance.

According to the direct monitoring method, there are formulas provided as follows:

Suppose V0 is an initial voltage value of the capacitance, V1 is a final voltage value of the capacitance on a full charge or discharge, and V1 is a voltage value of the capacitance at time t, then $Vt= "V0"+(V1-V0)*[1-\exp(-t/RC)]$. According to this formula, if want to work out the capacitance value, it just need to detect the voltage value and the charge-discharge time.

Based on the detection of capacitance by a capacitive touch screen IC for the, the detected capacitance value will be compared with the capacitance value stored in the CPU, and then the CPU will erase important data when the difference therebetween exceeding a threshold value.

In conclusion, the protection method of the present invention is achieved by detecting the change of the stray capacitance value of the signal lines by means of monitoring the signal lines in real time, judging that there is outside foreign matter detecting the signal lines if the change value is exceeding a preset threshold value and then erasing the important data in the electronic equipment. The method uses the manner of monitoring the stray capacitance to monitor the contact of outside foreign matter with the signal lines, thereby ensuring the security of data in the electronic device. The method has the characteristics that the implementation process is simple and easy, safe and reliable, and the cost is low. It could be applied for data protection of various kinds of electronic equipments in information field, such as an electronic equipment used for electronic trading, a storage equipment for storing significant data and so on.

The protection circuit of the present invention is achieved by an indirect monitoring method, and by connecting oscillating circuit composed of inverters, resistors and capacitors with wire to be detected, the change of the stray capacitance of the wire will cause the change of the oscillation frequency. When the outside foreign matter contacting with the wire to be detected, the processor will detect the change of the oscillation frequency and then will make a judgment that there is contact of outside foreign matter with the signal line, and finally will output alarm signal and related processing signal. The protection circuit is not only safe and reliable, but also has short development cycle, low manufacturing cost and simple structure; and it is easy to produce and could be applied to different electronic equipments, such as POS machine, ATM machine and so on. The important data information of the electronic equipment may be detected from the outside by selecting some of the wires, thus a multiplexer is used so that more than one wire to be detected could share one capacitance detection module thereby saving costs and optimizing the circuit structure. Additionally, by means of using composite control signal of the processor to select certain one of the analog channels to be breakover, when an illegal person removes the capacitance detection module, only one of the frequency signals of the wires to be detected before the module is removed could be recorded. If the frequency signal is replaced with other signal, it is hard to make a match with the composite control signal of the processor, and the other frequency signals even cannot be replaced with other signals, thereby increasing the difficulty of the data theft of the electronic equipment and greatly enhancing the safety performance of the electronic equipment.

The protection circuit of the present invention also could be achieved by using capacitance detection chip with multiple detecting ports to monitoring the stray capacitance of each signal line directly thereby determining whether each of the signal lines contacts with the conductive foreign matter. The circuit structure uses an integrated chip to monitor the change of the stray capacitance of each signal line in real time and in sequence or at random. It has the characteristics that the circuit structure is simple, the cost is low, it is easy to produce and maintain and it is not easy to break.

The present invention could be applied to POS machine, be applied to equipment used for electronic trading, such as ATM machine, and be applied to storage equipment for storing significant data, such as database of safety management department and so on.

Above descriptions of embodiments are provided for further illustrating the technical content of the present invention, so as to facilitate understanding and it is to be understood that the invention is not to be limited to the disclosed embodiments. Any technique extension and recreation according to the present invention should be included within the scope of protection of the invention.

What is claimed is:

1. A method for protecting data information of an electronic equipment comprising a processor, an electronic device, and a signal line connecting the electronic device to the processor, comprising the following steps:
performing a power-on detection on the electronic equipment of which production and installation are completed, detecting stray capacitance of the signal line thereof, and recording same as a standard value of the signal line;
during a power-on operation, monitoring the stray capacitance of the signal line; and
comparing a monitored capacitance value with the standard value, and erasing protected data resided in the electronic equipment when exceeding a preset threshold value, otherwise monitoring the stray capacitance of the signal line during the power-on operation;
wherein the number of the signal lines is more than one, during the power-on detection, recording the standard value of the stray capacitance of each signal line, and during the power-on operation, monitoring the stray capacitance of each signal line sequentially or randomly and comparing each monitored capacitance value with corresponding standard value;
wherein the stray capacitance of the signal line is monitored by an indirect monitoring method which comprises steps of: monitoring oscillation frequency of a RC oscillating circuit or a LC oscillating circuit connected with the stray capacitance and working out capacitance value of the stray capacitance according to a formula about oscillation frequency; and
wherein a selecting circuit is provided between the signal lines and the RC oscillating circuit or the LC oscillating circuit for building communications between the signal lines and the RC oscillating circuit or the LC oscillating circuit one by one.

2. A circuit for protecting data information of an electronic equipment, comprising a processor and an electronic device connected with the processor via a signal line, wherein further comprises a capacitance detection module electrically connected with the signal line, the capacitance detection module having a detecting end connected with the signal line and a pulse output end connected with the processor; when performing power-on detection on the electronic equipment for the first time, a pulse signal formed by the stray capacitance of the signal line together with the capacitance detection module is transmitted to the processor, and then the frequency of the pulse signal is recorded as a standard frequency by the processor; during the use of the electronic equipment, the processor compares a received real-time frequency with the standard frequency and makes a judgment that there is outside foreign matter contacting with the signal line if there is a difference between the real-time frequency and the standard frequency exceeding a preset value, the stray capacitance of the signal line is changed and the pulse signal formed by the capacitance detection module combining the stray capacitance is also changed and the processor erases protected data resided in the electronic equipment; the signal line is a connecting wire connecting the electronic device and the processor;
wherein the capacitance detection module is a RC oscillating circuit comprising an inverter;
wherein the number of the signal lines is more than one; and a multiplexer is provided between the signal lines and the capacitance detection module;
wherein the multiplexer is an analog 8-channel multiplexer which has eight input ends connected with the signal lines, one output end connected with the capacitance detection module and three control input ends connected with the processor, and the analog 8-channel multiplexer determines which one of the input ends to communicate with the output end according to a composite signal from the three control input ends; when performing power-on for the first time, the processor sends eight composite signals to the analog 8-channel multiplexer one by one, and records a pulse frequency produced by the capacitance detection module together with the signal line relative to each composite signal as a standard frequency relative to the composite signal; during the use, the processor sends out the composite signals one by one or at random and compares the received real-time frequency with the standard frequency relative to the composite signal, and the processor will make a judgment that there is outside foreign matter contacting with the signal line relative to the composite signal if there is a difference between the real-time frequency and the standard frequency relative to the composite signal exceeding a preset value, the stray capacitance of the signal line is changed and the pulse signal formed by the capacitance detection module combining the stray capacitance is also changed and the processor sends out an alarm signal and/or a signal for protecting the protected data; the electronic equipment is a POS machine, an ATM machine or a cash register; and the electronic device comprise a keypad, a display screen, an IC card reader and a magcard reader.

3. A circuit for protecting data information of an electronic equipment, wherein the electronic equipment is a point-of-sale (POS) machine and the circuit for protecting data information comprises:

a multi-channel selecting module, the multi-channel selecting module being a 74HC4051 type multi-channel chip which has eight external signal input ends, three digital selecting ends and one signal output end; and a capacitance detection module, comprising a first inverter, a second inverter and a third inverter, an input end of the first inverter being connected with the output end of the multi-channel selecting module via a first capacitor, an output end of the first inverter being connected with an input end of the second inverter, an output end of the second inverter being connected with an input end of the third inverter, a first resistor being connected between the input end and the output end of the first inverter, the input end of the first inverter being connected with the output end of the second inverter via a second resistor and a second capacitor both of which are connected in series and a connection point of which is connected with an output end of the third inverter via a third resistor, the input end and the output end of the third inverter being connected to an output end via a fourth resistor and a fifth resistor, respectively; a power input end of the first inverter being grounded via a third capacitor and a fourth capacitance both of which are connected in parallel.

* * * * *